United States Patent [19]
Breitenbach

[11] 3,751,938
[45] Aug. 14, 1973

[54] APPARATUS FOR CONTROLLING LOW-TEMPERATURE INSTALLATIONS

[75] Inventor: Otto Breitenbach, Mainz-Kostheim, Germany

[73] Assignee: Linde Aktiengesellschaft, Wiesbaden, Germany

[22] Filed: Feb. 28, 1972

[21] Appl. No.: 229,863

[30] Foreign Application Priority Data
Feb. 26, 1971 Germany......... P 21 09 309.4-13

[52] U.S. Cl................. 62/126, 62/229, 317/135 A, 340/292
[51] Int. Cl............................................ F25b 49/00
[58] Field of Search............... 317/135 A; 62/126, 62/129, 228, 229; 340/292; 236/94

[56] References Cited
FOREIGN PATENTS OR APPLICATIONS
659,063  3/1963  Canada........................... 317/148.5

*Primary Examiner*—William E. Wayner
*Attorney*—Karl F. Ross

[57] ABSTRACT

A system for controlling low-temperature installations, such as refrigeration units for maintaining foods and other perishable items at low temperatures, wherein the cooling system is regulated by a thermostat having a transistor and relay arrangement for preventing cutoff of the cooling unit upon failure of the thermostat circuitry.

9 Claims, 2 Drawing Figures

PATENTED AUG 1 4 1973    3,751,938

APPARATUS FOR CONTROLLING LOW-TEMPERATURE INSTALLATIONS

FIELD OF THE INVENTION

My present invention relates to an apparatus for controlling low-temperature installations and, more particularly, to a system for regulating the temperature of a cooling unit.

BACKGROUND OF THE INVENTION

Thermostatic systems are commonly provided for low temperature installations, e.g., refrigeration units for maintaining foods and other perishable substances at or below a temperature much lower than ambient, such installations comprising a mechanical or electromechanical cooling unit and a thermostatic system responsive to the temperature in the enclosure cooled thereby.

In the event of failure of the thermostatic system, the cooling unit is generally cut off or rendered inoperative whereby the temperature rises in the cooled space and the protected items may be destroyed. The thermostat circuitry for such purposes may include switching devices such as relays which depend upon energization by the thermostat circuit to turn on or turn off the cooling unit. Certain defects are common in thermostatic systems because of the nature of the temperature-sensitive element and the conventional thermostat circuitry. For example, the temperature sensor may be short-circuited or disconnected from the circuit, leading to an absence of current flow or a current surge. Furthermore, the absence of current in the sensing circuit may arise from a failure of the power supply serving the thermostat.

These essentially opposite effects are particularly disadvantageous in cooling systems in which foods are to be maintained at low temperatures, e.g., deep-freeze temperatures. It is well-known that a rise in the temperature of such products, as a result of failure of the cooling system, is nonreversible and cannot be overcome by freezing. Once the temperature of the product rises above the freezing point to permit defrosting, even to a slight extent, the product deteriorates rapidly even if refrozen. Similar disadvantages arise with other cooling requirements, e.g., in the refrigeration of blood, pharmaceutical substances and various chemicals.

Consequently a system for protecting against the failure of a thermostat arrangement has long been sought but has not heretofore been practically realizable.

OBJECTS OF THE INVENTION

It is, therefore, the principal object of the present invention to provide a system for protecting a cooling installation against failure of the thermostat arrangement and ensuring the maintenance of low temperatures in the cooled space in spite of such failure.

Another object of the invention is to provide apparatus for maintaining the requisite low temperatures in a cooled space in spite of failure of a temperature-controlling thermostat which will avoid the disadvantages of earlier systems as described above.

Yet a further object of the invention is to provide an improved control system for a cooling unit whereby short-circuiting or open circuiting of the temperature-responsive element or failure of the thermostat power supply will not result in a temperature increase in the protected space.

SUMMARY OF THE INVENTION

These objects and others which will become apparent hereinafter are obtained, in accordance with the invention, with a system in which failure of the temperature-sensitive element, short-circuiting thereof or failure of the power supply of the thermostat circuitry will produce a signal switching the cooling unit into continuous operation. The term "signal" is used here in the sense in which it applies to control systems generally, i.e., to indicate an output having a functional relationship to an input and representing a change of state or condition relative to some prior condition. The "signal" may be the generation of an electric current with some parameter different from that of a previous electric current, the absence of electric current where an electric current was previously present, or the presence of an electric current where such current previously was absent. It may be represented as a purely mechanical response, namely, the alternation of switch positions.

More specifically, the present invention provides a thermostat having a temperature-responsive element and circuitry connecting same to a cooling unit for triggering the unit into operation upon a temperature rise and terminating the operation of the unit upon temperature fall below a predetermined temperature level or threshold. The circuit also includes means responsive to failure of the current supply to the temperature-responsive element and sensitive to a short-circuiting of the temperature-responsive element or an interruption in the current flow therethrough for energizing the cooling unit for continuous service.

The circuit for controlling the temperature produced by the cooling device preferably comprises a voltage-divider network and a relay network connected in parallel with one another across the terminals of a thermostat-supply source, the latter network having a switching relay and at least one transistor in series. The two networks are connected by a further transistor for signal inversion and so poled as to render the relay-network transistor conductive upon a temperature fall or nonconductive or blocking upon temperature rise. Since the relay network is connected across the thermostat-supply source, a failure of the latter will have the same effect as a triggering of the relay-network transistor into the blocking condition.

According to another feature of the invention, the relay network comprises, in addition to the first relay-network transistor, a second relay-network transistor connected by a coupling resistor to a tiepoint between the temperature sensor and a diode of the voltage-divider network which comprises a resistive-type temperature sensor, the diode and a further resistor in series across the terminals of the thermostat-supply source. According to still another feature of the invention, a signaling relay is provided in circuit with one of the relay-network transistors and the source for operating an acoustical or optical signal adapted to alert operating personnel to the failure of the thermostat system. The control relay of the present invention is provided in such a manner that the cooling or refrigerating unit is turned on whenever the control relay is de-energized. Conversely the cooling unit is turned off when the control relay is energized at a predetermined potential and conducts a current therethrough.

In the event of failure of the supply to this relay, therefore, the cooling unit will be switched into continuous service. The interruption or open circuiting of the temperature-sensitive element, moreover, produces a signal at the control transistor which, upon inversion, switches the relay-network transistors, or one of them, into a nonconductive state and similarly blocks current flow through the control relay, thereby switching the controlling unit into continuous service. Finally, a short-circuiting of the temperature-responsive resistor, e.g., a thermistor, will provide, through the other relay-network transistor, a blocking condition which will also render the cooling unit defective in continuous service.

The system described above in a relatively simple manner provides security against thermostat failure in refrigeration chambers, buildings and the like, in refrigerated vehicles and vessels, and in domestic, commercial and industrial refrigeration systems. It has been found to be particularly valuable for refrigeration systems for the storage of blood in hospitals and elsewhere in situations in which a nonreversible deterioration of the refrigerated product may result.

DESCRIPTION OF THE DRAWING

The above and other objects, features and advantages of the present invention will become more readily apparent from the following description, reference being made to the accompanying drawing in which.

SPECIFIC DRAWING

Figure 1:
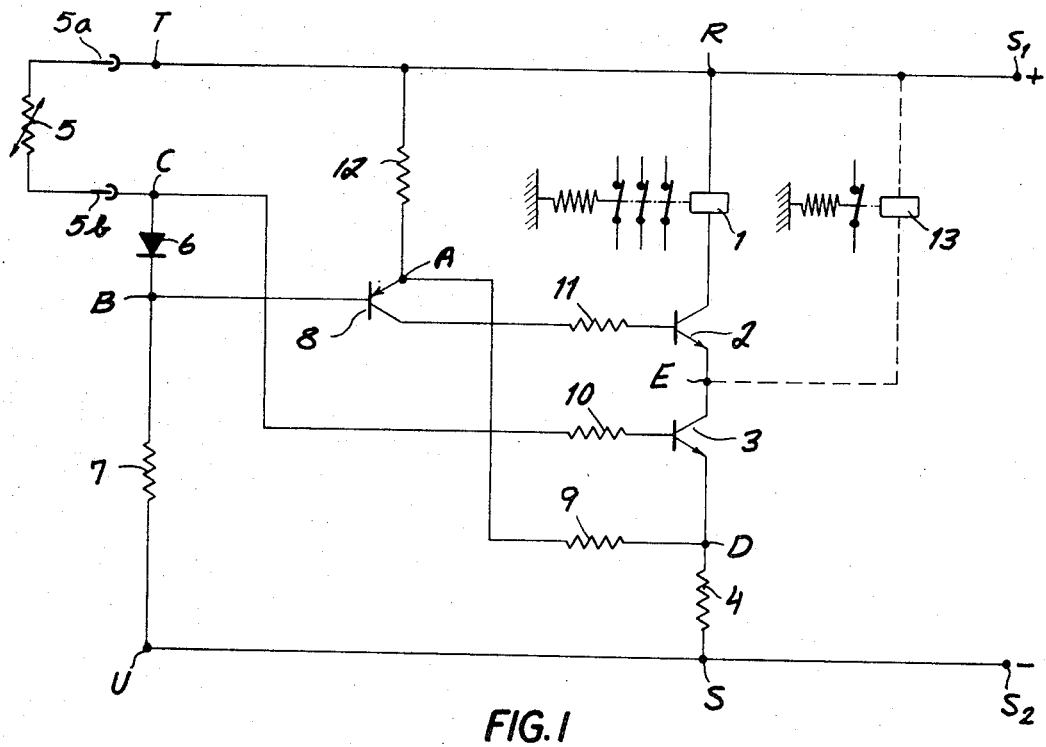
FIG. 1 is a circuit diagram illustrating the invention.
Figure 2:
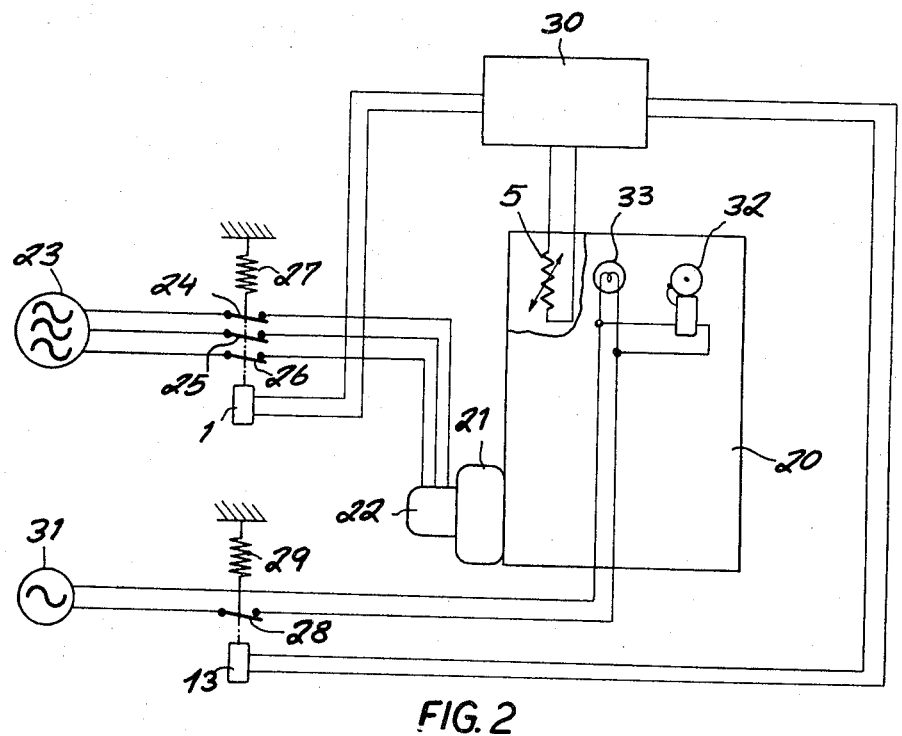
FIG. 2 is a diagram illustrating the application of the circuit of FIG. 1.

In FIG. 1 of the drawing, I show a thermostat circuit for the control of the cooling system which has been illustrated at 20 in FIG. 2. In the latter Figure, the cooling system comprises a refrigeration unit 21 of conventional type, including a compressor, a condenser, evaporator and associated blowers, the compressor being provided with a motor 22 which is energized from the a.c.-line source 26 via the normally closed switch contacts 24, 25, 26 of a control relay 1. A spring 27 diagrammatically represents any means for closing the contacts 24 – 26 in the absence of a current sufficient to effectively energize the relay 1. The refrigerated chamber 20 is provided at some convenient interior location with a resistive-type temperature-responsive element as shown at 5, e.g., a thermistor, which is connected to the control circuit diagrammatically represented at 30. Also connected to this control circuit is the signal relay 13 whose contact 28 is normally closed, e.g., by a spring 29. Contact 28 lies in series with the line source 21 and any conventional signaling system which may be mounted upon the exterior of the protected chamber 20. In this case, the signaling system represents an acoustical device such as a bell 32 and an optical device such as the lamp 33.

The circuit 30 and the relays, temperature-responsive element, etc. have been shown in some detail in FIG. 1.

The circuit comprises a relay network between the junctions R, S, comprising, in series, the control relay 1 and the collector-emitter branches of a pair of NPN transistors 2, 3, and a current-limiting and biasing resistor 4. In parallel with this network across the terminal $S_1$ and $S_2$ of a direct-current thermostat supply source, is a sensing voltage-divider network between the terminals T and U, this network comprising, in series, the thermistor 5, a diode 6 and a resistor 7. The temperature-responsive element or thermistor 5 may be connected in the circuit by plug-and-jack junctions 5a and 5b to enable replacement thereof.

Between the two networks R – S and T – U, there is provided a control transistor 8 of the PNP type which is responsive to the electrical potential at the tiepoint B between the forward end of diode 6 and resistor 7. The diode 6 is thus located between point B and the positive terminal $S_1$ of the source. The collector of transistor 8 is connected via resistor 11 to the base of NPN transistor 2 while a junction A at the emitter potential of transistor 8 is connected to the base of transistor 3 via a resistor 10. A bias resistor 12 is provided between point A and the positive terminal $S_1$ of the source. A further bias resistor is provided at 9 between a point D to the potential of the emitter of NPN transistor 3 and point A at the emitter potential of PNP transistor 8. In the absence of a negative potential at point B (approximate balance of the two branches of the voltage divider) the transistor 8 is nonconductive. Transistor 8 is so poled that as point B goes negative, a positive signal is applied to the base of transistor 2 and the latter is switched into a conductive state. Point B goes negative as the resistance of the temperature-responsive element changes in one direction in response to a temperature change and approaches a positive value as the resistance of element 5 changes in the other direction. At point C, a positive signal is applied to transistor 3 to render the latter conductive as well so that a current flows in relay network R – S and relay 1 is energized to open contacts 24 – 26 and cut off the cooling unit.

In the event of failure of the thermostatic sensor 5, e.g., as a result of an interruption in this circuit element, a negative potential is developed at point C with the result that transistor 3 is placed in a blocking state via the signal transmitted through transistor 10 and the circuit to relay 1 is thereby interrupted. Contacts 24–26 thereupon close and the cooling unit is placed in continuous service.

When, however, the sensor 5 is short-circuited, the potential at point B reaches a level sufficient to block transistor 8 and thereby block transistor 2 via the signal transmitted through resistor 11. The relay 1 is de-energized and the cooling unit is placed in continuous operation.

In the third case wherein the supply source at $S_1$, $S_2$ fails, no current is applied to the relay 1 and the contacts 24 – 26 are placed in their make-position to operate the cooling unit with continuous service. The diode 6 ensures that, in the event of an interruption in the conductors of the sensor 5, a positive signal will appear at point A while signals at point B and C of transistor 3 are developed to render transistor 3 conductive. It will be also apparent that the relay 13, which is connected at point E between the transistors 2 and 3, will set off the alarms 32 and 33 when the cooling unit is placed in continuous service, i.e., is no longer turned off in response to a temperature drop.

I claim:

1. In a system for cooling wherein a cooling unit is controlled by a temperature sensor through an electric circuit connected between said sensor and said unit driving said unit upon a temperature rise detected by said sensor and turning off said unit upon a temperature fall detected by said sensor; the improvement wherein said circuit is connectable to a thermostat-supply source of electric current and comprises:
a. a voltage-divider network connected across said source and including in series, said sensor, a diode and a resistor;
b. a relay network connected in parallel with said voltage-divider network across said source and including, in series, a control relay operatively connected to said unit for turning same on and off in accordance with the energization state of said control relay, the emitter-collector path of a first relay-network transistor, the emitter-collector path of a second relay-network transistor, and a resistor; and a control transistor connected between said voltage-divider network and at least one of said relay-network transistors for controlling the conductive states thereof.

2. The improvement defined in claim 1 wherein said control transistor has a base connected to said voltage-divider network between the diode and the resistor thereof, said first transistor has a base connected to said control transistor and said second transistor has a base connected to said voltage-divider network between said sensor and said diode.

3. The improvement defined in claim 2 wherein said control transistor is of the PNP type and is connected to a terminal of said source common to said network by a bias resistor at the emitter of said control transistor, the collector of said control transistor being connected to the base of said first transistor by a resistor, the emitter of said control transistor being connected to the emitter of said second transistor by yet another resistor and the emitter of said second transistor being connected to another terminal of said source by still another resistor.

4. The improvement defined in claim 3 wherein said first and second transistors are of the NPN type.

5. The improvement defined in claim 4 wherein said control relay is provided with normally closed contacts opened upon energization of the relay and connected in circuit with said control unit.

6. The improvement defined in claim 5, further comprising a signaling relay connected in parallel with said control relay to said relay network and effective to generate a warning signal upon the operation of said unit in continuous service.

7. The improvement defined in claim 6, further comprising an acoustic device electrically connected to said signaling relay for energization thereby.

8. The improvement defined in claim 6, further comprising an optical device electrically connected to said signaling relay for energization thereby.

9. The improvement defined in claim 6 wherein said sensor is a thermistor.

* * * * *